United States Patent [19]

Föhl

[11] Patent Number: 5,310,220

[45] Date of Patent: May 10, 1994

[54] DRIVE UNIT IN A RESTRAINING SYSTEM FOR VEHICLE OCCUPANTS

[75] Inventor: Artur Föhl, Schorndorf, Fed. Rep. of Germany

[73] Assignee: TRW Repa GmbH, Alfdorf, Fed. Rep. of Germany

[21] Appl. No.: 2,931

[22] Filed: Jan. 11, 1993

[30] Foreign Application Priority Data

Jan. 20, 1992 [DE] Fed. Rep. of Germany ....... 4201374

[51] Int. Cl.$^5$ .............................................. B60R 21/26
[52] U.S. Cl. .................... 280/806; 297/480; 60/638
[58] Field of Search ................ 280/805, 806, 807; 297/480; 60/632, 635, 636, 637, 638

[56] References Cited

U.S. PATENT DOCUMENTS

| | | | |
|---|---|---|---|
| 2,928,538 | 12/1955 | Mazis | 60/638 |
| 2,948,898 | 8/1960 | Haskell | 60/637 |
| 3,871,470 | 3/1975 | Schwanz et al. | |
| 4,288,098 | 9/1981 | Tsuge et al. | 280/806 |
| 4,458,921 | 7/1984 | Chiba et al. | 280/806 |
| 4,927,175 | 5/1990 | Föhl | 297/480 |

FOREIGN PATENT DOCUMENTS 2223061  5/1972  Fed. Rep. of Germany .

OTHER PUBLICATIONS

European Search Report EP 93100495.6.

*Primary Examiner*—Karin L. Tyson
*Attorney, Agent, or Firm*—Tarolli, Sundheim & Covell

[57] ABSTRACT

For loss-free deflection of the gases generated by a gass generator (22) in a drive unit for a restraining system for vehicle occupants, the connecting passage comprising a deflection is formed between the outlet (24) of the gas generator (22) and a space (26) beneath the piston (16) of a Piston/cylinder drive free from discontinuities at which reflections of the pressure wave generated could occur. The connecting passage consists of two straight passage portion (30, 32) extending inclined to the axis of the gas generator (22) and a curved portion which connects said portions and which is formed by a concave recess (34) in the bottom of the bore (20) into which the gas generator (22) is inserted.

13 Claims, 2 Drawing Sheets

DRIVE UNIT IN A RESTRAINING SYSTEM FOR VEHICLE OCCUPANTS

BACKGROUND OF THE INVENTION

The present invention relates to a drive unit in a restraining system for vehicle occupants, comprising a pyrotechnical gas generator which is inserted into a bore of a housing and the gas outlet of which faces the bottom of the bore, and a connecting passage arranged in the housing, having a deflection and disposed between the bore and a space formed in the housing.

FIELD OF THE INVENTION

The restraining system is for example a safety belt system with belt tightener or a gas-bag impact protection. For constructional reasons a deflection is often necessary between the gas outlet of the gas generator and the location at which the gases generated by the gas generator are to develop their effect. In a piston/cylinder drive for belt pretensioners, for constructional reasons it is sometimes expedient to arrange the cylinder and gas generator parallel adjacent each other on a common housing block. The connection between the housing bore into which the gas generator is inserted and the cylinder is via a connecting passage which in all must have a 180° deflection. Such a connecting passage may be formed by three intersecting bores at right-angles to each other. The formation of the connecting passage from a plurality of intersecting straight bores was hitherto considered expedient because it is easy to carry out from the production technical point of view. Since the three passage portions thereby arising have a uniform cross-section, there was no cause to rethink the configuration of the connecting passage. The invention proceeds from the recognition that the operation of the gas liberation by the gas generator is a complex dynamic process because within only 1 to 2 milliseconds a pressure of a few hundred atmospheres is generated. Consideration was given to the possibility that the gases are not progressively further conducted through the various passage portions in the expected manner but on the contrary oscillations and shock wave effects can occur which lead to an increased residence time of the gases in the connecting passage. The longer the gases remain in the connecting passage the greater they will be cooled. However, a cooling of the gases resets in a reduction of the utilizable pressure.

SUMMARY OF THE INVENTION

With the invention underlying problem of which resides in utilizing the pressurized gases generated by a gas generator in optimum manner after their deflection, a practically loss-free deflection of the pressurized gases is obtained. This is achieved according to the invention in that the deflection of the connecting passage is formed at least partially by a concave recess which is arranged in the bottom of the bore and into which a first passage Portion originating from the gas outlet of the gas generator opens at least approximately tangentially and from which a second passage portion leading to the space in the housing eliminates at least approximately tangentially. If it is assumed that the gases generated by the gas generator are progagated in the manner of a pressure wave, the wave fronts will never strike a discontinuity at which reflection could occur. On the contrary, by the rounding if the concave recess they are progressively deflected and conducted from the first preferably rectilinearly formed passage portion to the second preferably likewise linear passage portion. It is not possible with the measuring methods available to describe exactly the processes occurring during the deflection. It has however been found that with the configuration of the connecting passage according to the invention after deflection of the gases a utilizable gas pressure is available which is almost twice as high as is the case with deflection by three Passage portions intersecting each other at right-angles. With the configuration of the connecting passage according to the invention deflection losses are almost completely avoided.

BRIEF DESCRIPTION OF THE DRAWINGS

Further features and advantages of the invention will be apparent from the subsidiary claims and from the following description of several examples of embodiment with the aid of the drawings, wherein:

DESCRIPTION OF THE PREFERRED EMBODIMENTS

Figure 3:
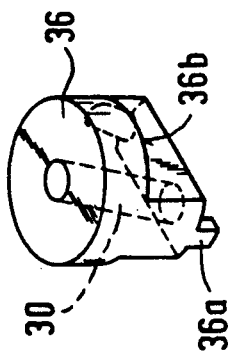
FIG. 3 is a sectional view analogous to FIG. 2 but showing a modified embodiment.

The drive unit shown in the drawings is intended for a belt pretensioner having a piston/cylinder drive. A block-shaped housing 10 comprises a threaded bore 12 into which one end of a cylinder 14 is screwed. Mounted in the cylinder 14 is a piston 16 to which a pulling cable 8 is secured which emerges from the housing 10 and leads to the periphery of a pulley (not shown) at the side of a belt retractor (likewise not shown). A gas generator cartridge 22 is inserted into a further bore 20 of the housing lo. The gas outlet 24 of the gas generator cartridge 22 is disposed centrally at the end thereof facing the bottom of the bore 20. The gases emerging from the gas outlet 24 must be deflected and conveyed to a conical space 26 beneath the piston 16. For this purpose a connecting passage is provided which consists a first straight passage portion 30 originating from the gas outlet, a second straight passage portion 32 opening into the space 26 and a third curved passage portion 34 which connects the straight passage portions 30, 32 together. The curved passage portion 34 is formed by a concave recess in the bottom of the bore 20. The first passage portion 30 enters said recess approximately tangentially and the second passage portion 32 leaves said recess approximately tangentially. Like the first part of the passage portion 32 originating from the recess 34, the first passage portion 30 is formed in a guide piece 36 which is inserted into the cylindrical space between the end of the gas generator cartridge 22 and the bottom of the bore 20. The first passage 30 extends inclined to the axis of the guide piece 36 from the upper end face thereof to the lower end face thereof. The part of the second passage portion 32 adjoining the recess 34 forms a recess in the lower side face of the guide piece 36.

As apparent from the drawings, the connecting passage between the gas outlet 24 and the space 26 in no way takes the shortest possible connecting path. On the contrary, the distance is considerably increased by the first passage portion 30 extending from the center of the gas generator cartridge radially outwardly up to the concave recess 34. It has been surprisingly found that this lengthening of the distance travelled and the cooling of the gases thereby to be feared is of no disadvantage compared with the advantages which result from avoiding discontinuities along the propagation path of the pressurized gases. Due to the extremely high propagation velocity the greater part of the gases moves along the outer periphery of the connecting passage, i.e. along the uniform curvature of the recess 34. A progressive deflection of the gases takes place there and consequently reflections are avoided.

Figure 2:
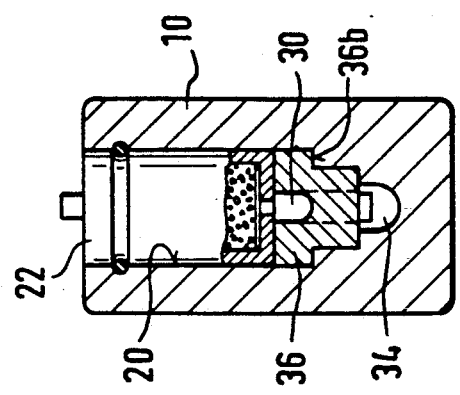
FIG. 2 is a sectional view along the line II—II of FIG. 1 according to a first embodiment.
Figure 1:
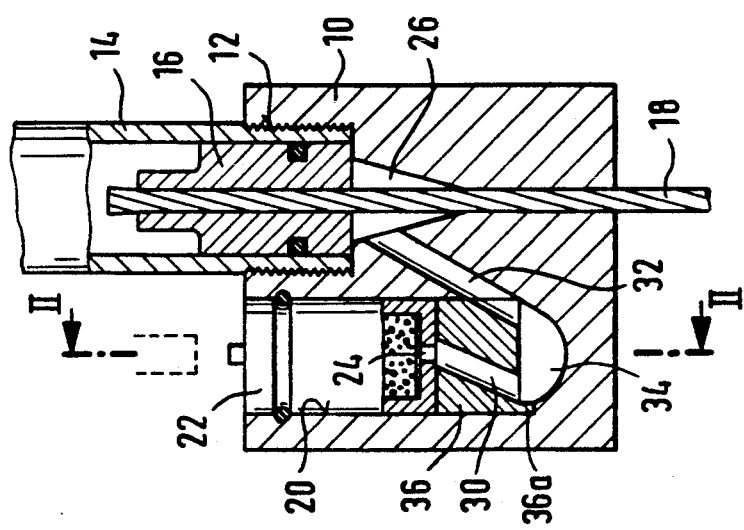
FIG. 1 shows a schematic partial section of the drive unit of a belt tightener.

In the embodiment according to FIGS. 1 and 2 the recess 34 has the form of a spherical cap. To ensure the correct seat of the guide piece 36 in the bore 20 said piece is provided with a nose 36a which engages into a matching recess at the bottom of the bore 20.

Figure 5:
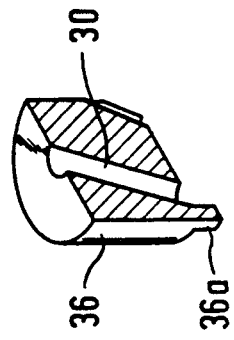
FIG. 5 is a schematic perspective view of the guide piece in the embodiment according to FIG. 3.
Figure 4:
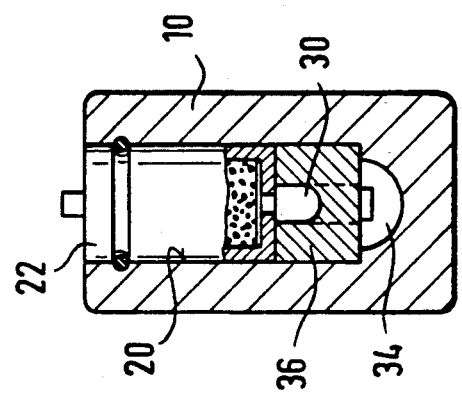
FIG. 4 is a partially sectioned perspective view of a guide piece in the embodiment according to FIG. 1 and 2.

In the embodiment according to FIGS. 3 and 5 the guide piece 36 is provided with a step 36b which fits on a radial shoulder of the bore 20. The concave recess 34 at the bottom of the bore 20 is partially annular; the passage portions 30, 32 adjoin the partially annular form of the recess 34 approximately tangentially.

Figure 7:
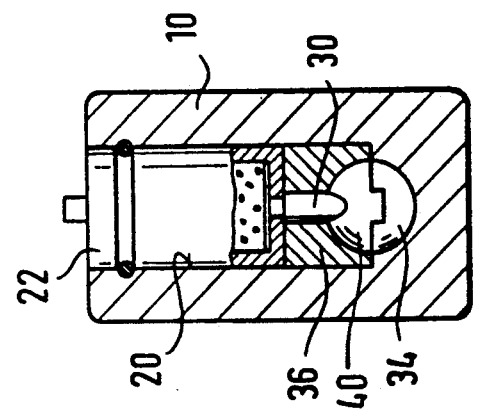
Figure 9:
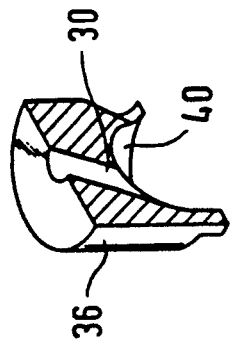
Figure 6:
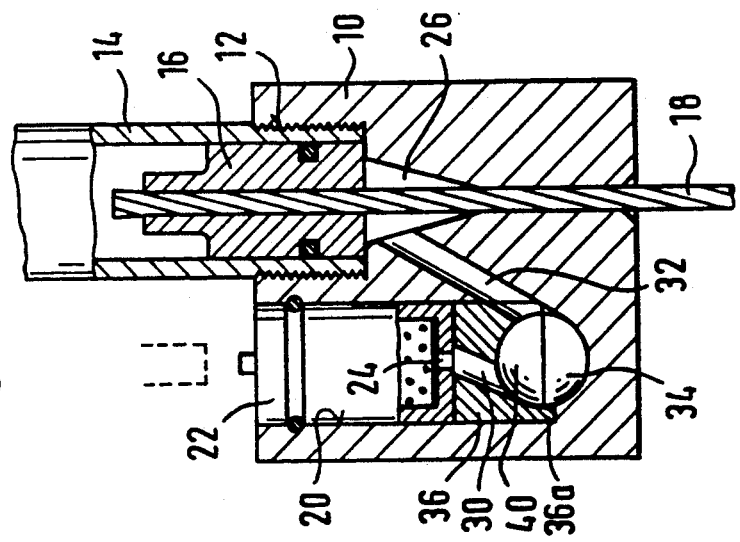

In the embodiment according to FIGS. 6, 7 and 9 the guide piece 36 is provided with a recess 40 which lies opposite the recess 34 and is symmetrical therewith. The two hemispherical recesses 34, 40 complement each other to form a hollow sphere. The passage portions 30, 32 enter said hollow sphere approximately tangentially. The gases from the passage portion 30 entering the hollow sphere are initially only incompletely further conveyed via the passage portion 32. They move further along the periphery of the hollow sphere and meet the pressurized gases following from the first passage portion 30, being entrained by said gases and again accelerated. This mechanism leads to a short residence time of the gases at the deflection point of the connecting passage and consequently promotes the low-loss transfer of the gases from the gas outlet 24 to the space 26.

Figure 8:
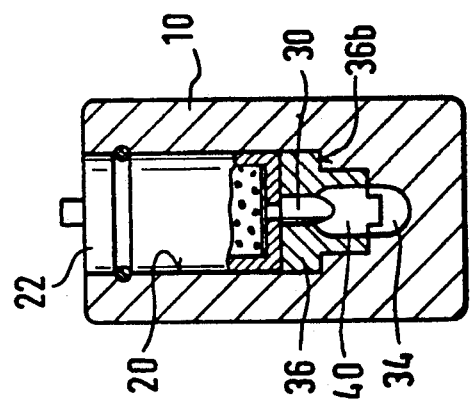
FIGS. 6 to 10 show modifications of the embodiments illustrated in FIGS. 1 to 5.
Figure 10:
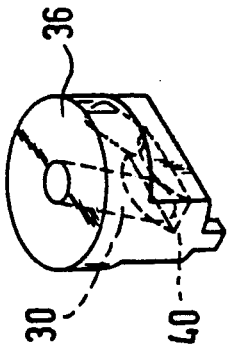

In the embodiment according to FIGS. 8 and 10 the recess 34 is half annular and is complemented by a recess 40 of the same shape at the bottom of the guide piece 36 to give an annular form. The mode of operation is fundamentally the same as in the embodiment according to FIGS. 61, 7 and 9. The gases circulating in the rings are accelerated by the gases subsequently supplied from the first passage portion 30 and conveyed into the space 26 via the second passage portion 32 with low losses.

What is claimed is:

1. A drive unit for a pretensioner in a vehicle safety belt system, comprising a piston/cylinder unit, a housing with a bore and a pyrotechnical gas generator inserted into said bore, said bore having a longitudinal axis and a concave bottom formed by a rounded recess, and said gas generator having a gas outlet which faces said bottom of said bore, said cylinder having an end mounted in said housing and a longitudinal axis parallel to the axis of said bore, a connecting passage being arranged in said housing between said bore and a space formed in said housing adjacent said cylinder end, wherein said connecting passage comprises a first passage portion originating from the gas outlet of said gas generator, extending in a direction inclined to the axis of said bore and away from the axis of said cylinder and opening at least approximately tangentially into said rounded recess and a second passage portion of said connecting passage leading at least approximately tangentially from said concave recess to said housing space in a direction inclined to and approaching the axis of said cylinder.

2. The drive unit according to claim 1, wherein said first and second passage portions are each formed to extend at least approximately rectilinearly.

3. The drive unit according to claim 1, wherein said rounded recess has an outer periphery which is at least approximately arcuate.

4. The drive unit according to claim 3, wherein said arcuate outer periphery of the recess has a radius which is substantially equal to the radius of said bore of the housing.

5. The drive unit according to claims 1, wherein said first passage portion originating from the gas outlet of the gas generator is formed in a guide piece which is inserted at the bottom of the bore of the housing.

6. The drive unit according to claim 5, wherein an initial part of said second passage directly adjoining the concave recess is formed in said guide piece.

7. The drive unit according to claim 5, wherein said guide piece on its side facing said rounded recess has a concave recess of similar shape and size.

8. The drive unit according to claim 1, wherein said recess has at least approximately the form of a spherical segment.

9. A drive unit in a restraining system for vehicle occupants comprising a housing with a bore and a pyrotechnical gas generator inserted into said bore and having a gas outlet which faces the bottom of said bore, a connecting passage being arranged in said housing between said bore and a space formed in said housing, wherein said connecting passage has a deflection, which is formed at least partially by a concave recess arranged in the bottom of the bore, a first passage portion of said connecting passage originating from the gas outlet of said gas generator and opening at least approximately tangentially into said concave recess and a second passage portion of said connecting passage leading at least approximately tangentially from said concave recess to said housing space, said concave recess having at least approximately the form of a spherical segment, said first passage portion originating from the gas outlet of the gas generator being formed in a guide piece which is inserted at the bottom of the bore of the housing, said guide piece having a concave recess of similar shape and size as said concave recess arranged in the bottom of said bore on a side of said guide piece facing said concave recess in said bore.

10. A drive unit for pretensioner in a vehicle safety belt system comprising:
   a housing with a bore, said bore having a longitudinal axis and a concave bottom;
   a gas generator located within said bore and having a gas outlet which faces said concave bottom of said bore;
   a cylinder connected to said housing for receiving gas produced by said gas generator; and
   a piston located within said cylinder and connectable with a seat belt retractor;

said housing including a chamber located adjacent an axial end of said cylinder, a first passage for conducting gas from said gas outlet of said gas generator to said concave bottom of said bore, and a second passage for conducting gas from said concave bottom to said chamber, said first passage extending at an acute angle to the longitudinal axis of said bore and substantially tangential to said concave bottom, said second passage extending substantially tangential to said concave bottom of said bore.

11. A drive unit as set forth in claim 10 wherein said first passage extends from said gas outlet of said gas generator away from said cylinder and toward said concave bottom of said bore.

12. A drive unit as set forth in claim 11 wherein said first and second passages extend substantially parallel to each other.

13. A drive unit in a restraining system for vehicle occupants, comprising a housing with a bore having a central axis and a pyrotechnical gas generator inserted into said bore and having a gas outlet which faces the bottom of said bore, a connecting passage being arranged in said housing between said bore and a space formed in said housing, wherein said connecting passage has a deflection, which is formed at least partially by a concave recess arranged in the bottom of the bore, a first passage portion of said connecting passage originating from the gas outlet of said gas generator and opening at least approximately tangentially into said concave recess, said first passage portion extending inclined to the axis of said bore from the gas outlet radially outwardly to the vicinity of the peripheral wall of said bore and a second passage portion of said connecting passage leading at least approximately tangentially from said concave recess to said housing space.

* * * * *